United States Patent [19]
Kotliar

[11] Patent Number: 5,887,439
[45] Date of Patent: Mar. 30, 1999

[54] HYPOXIC CLEANROOM SYSTEMS FOR INDUSTRIAL APPLICATIONS

[76] Inventor: Igor K. Kotliar, 50 Lexington Ave., Suite 249, New York, N.Y. 10010

[21] Appl. No.: 858,099

[22] Filed: May 17, 1997

Related U.S. Application Data

[63] Continuation-in-part of Ser. No. 445,677, May 22, 1995, and a continuation-in-part of Ser. No. 505,621, Jul. 21, 1995, and a continuation-in-part of Ser. No. 739,379, Oct. 29, 1996, and a continuation-in-part of Ser. No. 797,242, Feb. 8, 1997.

[51] Int. Cl.[6] .................................................... A61L 9/00
[52] U.S. Cl. .............................................. 62/78; 426/418
[58] Field of Search ................................ 62/78; 426/418, 426/419; 454/187; 99/467

[56] References Cited

U.S. PATENT DOCUMENTS

| | | | |
|---|---|---|---|
| 4,685,305 | 8/1987 | Burg | 62/78 |
| 4,845,958 | 7/1989 | Senda et al. | 62/78 X |
| 5,120,329 | 6/1992 | Sauer et al. | 95/8 |
| 5,249,428 | 10/1993 | Barbe et al. | 62/78 |
| 5,355,781 | 10/1994 | Liston et al. | 62/78 X |
| 5,360,372 | 11/1994 | Newman et al. | 454/253 |
| 5,437,837 | 8/1995 | Olson et al. | 422/3 |
| 5,515,693 | 5/1996 | Cahill-O'Brien et al. | 62/78 X |

Primary Examiner—Harold Joyce

[57] ABSTRACT

Hypoxic cleanroom system is provided for industrial applications. The equipment of the system provides clean low-oxygen or oxygen free environments with climate control and at normal atmospheric or increased pressure. The system employs an oxygen-extraction device, which supplies oxygen-depleted air inside an enclosure communicating with the device. The system may employ a gas-recycling feature by drawing oxygen-depleted gas mixture from the enclosure back into an intake of the oxygen-extraction device wherein it is mixed with an ambient air intaken by the device or by using additional oxygen-extraction device for gas recycling. For cleanroom applications the system employs a gas-recirculating device, which draws internal gas mixture from a cleanroom interior for cleaning and regulating its temperature and humidity, and sends it back through a perforated ceiling, producing laminar flow inside cleanroom. The system may be applied to interior space inside any structure.

19 Claims, 6 Drawing Sheets

HYPOXIC CLEANROOM SYSTEMS FOR INDUSTRIAL APPLICATIONS

RELATED APPLICATIONS

This invention is a continuation in part and improvement of preceding patent applications of Igor K. Kotliar:

Ser. No. 08/445,677, "Apparatus for hypoxic training and therapy", filed May 22, 1995;

Ser. No. 08/505,621, "Hypoxic Room System and equipment for hypoxic training and therapy", filed Jul. 21, 1995;

Ser. No. 08/739,379, "Hypoxic flow system for individual active and passive hypoxic training", filed Oct. 29 1996;

Ser. No. 08/797,242, "Apparatus for passive hypoxic training and therapy", filed Feb. 8, 1997.

FIELD OF THE INVENTION

The present invention relates to a process and equipment for providing a low-oxygen (hypoxic) cleanroom environment for industrial applications.

The demand in clean room applications has been growing extensively in last years, especially for cleanrooms with a low oxygen content. Manufacturers of semiconductors and some other electronic and optical components, pharmaceutical and medical packaging companies, health care facilities, food processing, packaging and storage companies and many other industrial branches are looking today for clean, low-oxygen environment systems in order to increase the quality of their products and services.

DESCRIPTION OF THE PRIOR ART

At the present time many manufactures, mainly in semiconductor- and medical packaging industries, are forced to use services of nitrogen-gas suppliers to low oxygen content in their production cleanrooms or have to move their facilities to highlands.

Most commonly used method for providing a low-oxygen environment inside a cleanroom is pumping a nitrogen into it. This method is inconvinient and costly, and makes production process dependent from a gas availability. Moreover, nitrogen exiting cleanroom contaminates surrounding environment in the production facility requiring higher ventilation and/or air-conditioning costs.

Some low-oxygen or oxygen-free cleanrooms for automated production have to be hermetically sealed and are not easy accessable for servicing.

SUMMARY OF THE INVENTION

A principal object of this invention is to provide a method for producing an oxygen-depleted (or oxygen-free) environment inside a cleanroom.

Another object of the present invention is the provision of an oxygen-depletion process inside a cleanroom or other enclosure which employs pressure-swing adsorption air-separation equipment.

A further object of the present invention is the provision of an oxygen-depletion process inside a cleanroom or other enclosure which employs membrane air-separation equipment.

A still further object of the invention is to provide an oxygen-depleted cleanroom environment inside an enclosure at normal atmospheric or increased pressures.

A still further object of the invention is to provide an easily-accessible hypoxic cleanroom which does not need to be sealed from the surrounding environment.

Yet another object of the present invention is to provide a safe and environmentally-friendly hypoxic cleanroom which does not change the air composition in the surrounding environment.

Still another object of the present invention is the provision of a hypoxic cleanroom with controllable temperature and humidity.

A yet further object of the invention is to provide oxygen-depletion equipment which can produce filtered, sterile gas mixtures in order to provide hypoxic cleanroom environments from class 1000,000 up to class 0.1 and with a nitrogen content up to 99.99%.

A still further object of the invention is the provision of hypoxic cleanrooms having one, two or more anterooms, which allows frequent traffic and considerably reduces circulated air flow in order to save energy and the life of filters.

A still further object of the invention is to provide easily-accessible normbaric hypoxic microenvironments for people to work in safely without respiratory-support means, having an oxygen content from 14 to 15% which corresponds to the air composition at altitudes of 8,000 to 9,000 feet.

A still further object of the invention is to provide cleanrooms with an extremely low oxygen content (up to 0.05%), easily accessible with respiratory support devices.

A still further object of the invention is to provide cost-effective, easy-to-install, environmentally-friendly hypoxic cleanroom systems which can be used in a variety of industrial applications, including: microchip and semiconductor production, medical packaging, food processing, packaging and storage, health care, storage and/or transportation of inflammable and explosive materials, etc.

A yet further object of the invention is to provide a hypoxic gas recirculation system which can provide a sufficient flow of hypoxic gas mixture inside a cleanroom in order to produce stable laminar flow in desired direction and of desired flow rate; said system substantially extending the life of filtering devices.

Yet another object of the present invention is to provide a hypoxic gas recycling system which allows to use less energy and substantially extend life of filters and compressors.

A still further object of the present invention is to provide systems with low-oxygen or oxygen free environments for use in transportation and storage containers including food refrigerating enclosures.

Among the many advantages of the invented system is the complete elimination of costly nitrogen gas storage and supply. The invented system takes nitrogen from the surrounding environment but does not affect the surrounding air composition at all, because the same amount of nitrogen is constantly returned into the surrounding atmosphere.

Working in a simulated high-altitude environment will provide the benefits of "hypoxic training" effect described in preceding patent applications. This means that people working in hypoxic environments will get healthier resulting in substantial savings in health care and insurance costs.

Food processing, packaging and storage facilities could reduce their refrigeration costs and provide better quality of their products and packaging. Any grocery or flower shop could convert their storage room into a clean hypoxic environment and save on refrigeration.

A big advantage of hypoxic cleanrooms is that they are fully climate-controlled, which is important for many applications, and do not require huge quantities of air for circulation like usual cleanrooms do, which makes them highly cost-efficient.

DESCRIPTION OF THE INVENTION

It is well known that an oxygen-depleted or even oxygen-free environment is required in some industrial processes, like drug packaging or microchips and semiconductor production.. It can also keep meat, fruits, vegetables or flowers fresh for a longer period of time without refrigeration, which is very important because being frozen, they lose many qualities, including weight and taste.

Figure 1:
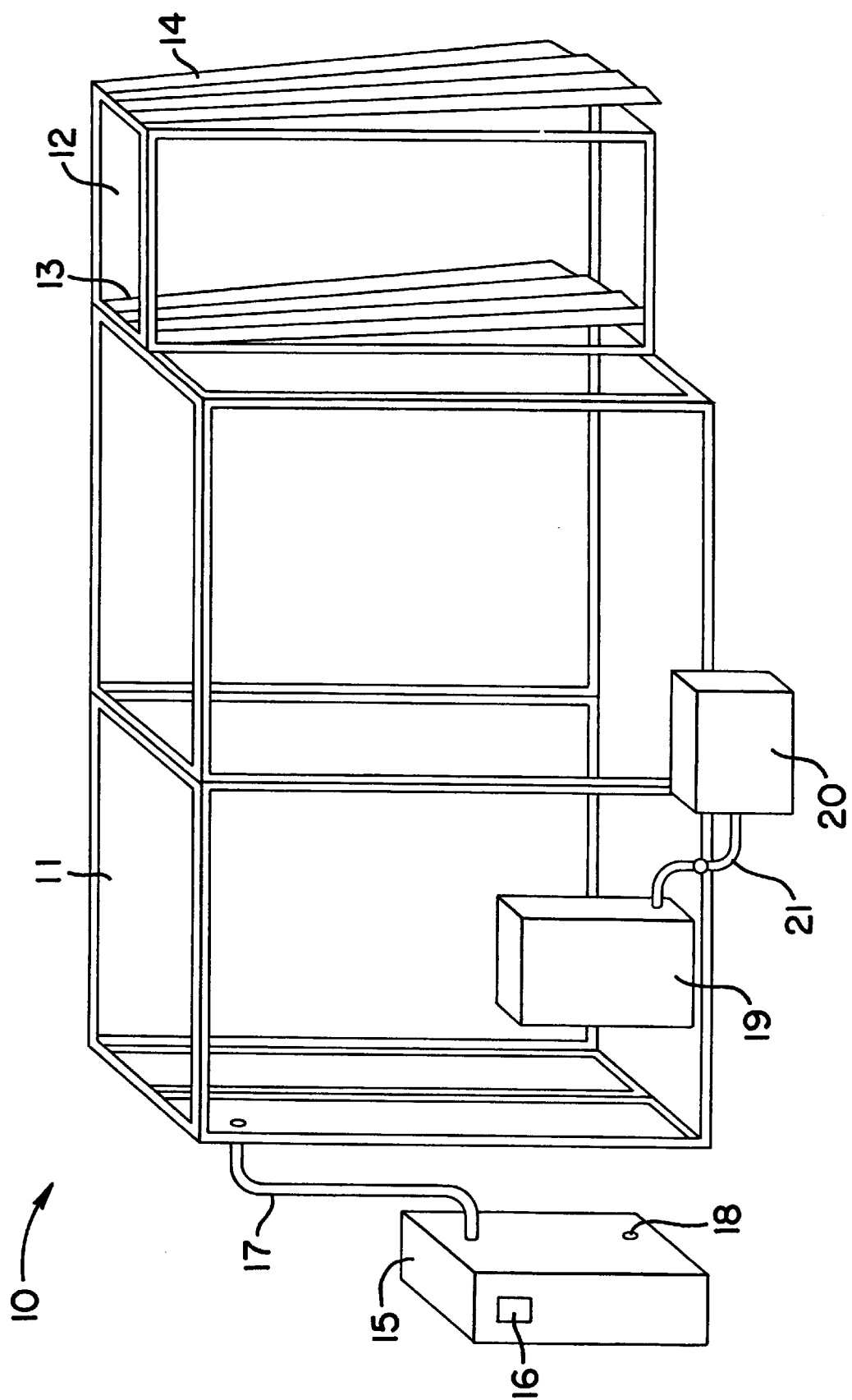
FIG. 1 shows the major components of the most preferred embodiment of the invented hypoxic cleanroom system.

FIG. 1 shows main components of the most preferred embodiment 10.

An enclosure 11 with anteroom 12 is made of softwall or hardwall modular panels which being connected to each other by snaps or bolts are easy to install in any cleanroom size and configuration. In many cases existing airtight rooms can be converted into hypoxic cleanrooms. Both enclosure 11 and anteroom 12 have easy-access strip doors 13 and 14 consisting preferably of a metal frame with free-hanging flexible flaps made of clear vinyl or other soft material. Swing doors or any other type of doors are acceptable. If airtight doors are used, ventilation openings or apertures must be made preferably in the lower portion of both doors 13 and 14. Modular panels are made preferably of clear vinyl, glass or plastic inserted in metal frames. Panels are installed directly on a floor or soft matting creating an airtight barrier between floor and each other. The same type panels are installed as the ceiling of a hypoxic cleanroom up to a cleanroom standard of Class 10,000.

An air-separation unit 15 is connected with enclosure 11 by conduit 17 through which oxygen-depleted air is supplied. Unit 15 takes ambient air through intake filter 16 and separates it into an oxygen-enriched fraction being disposed through outlet 18 and an oxygen-depleted fraction which is delivered through conduit 17 for distribution inside enclosure 11. Distribution of the incoming gas mixture may be delivered through a perforated ceiling (not shown) in order to create vertical laminar flow, or any other way required by application. Air-separation units 15 are available from Hypoxico Inc., New York, in various capacities and separation rates. These units employ membrane-separation and/or pressure-swing adsorption technologies. The working principle of those units was described completely in our previous patent applications.

Air-separation units employing pressure-swing adsorption technology are most suitable for hypoxic environments with approximately 15% O2 content in which people can work without respiratory support. Such hypoxic environments sigificantly decrease the oxidizing effect of ambient air (21% O2 at sea level). Most airborne microorganisms cannot exist in such an atmosphere and many materials lose their inflammability.

Membrane separation units are most suitable for extreme hypoxic environments required for some applications. They can produce air with as low as 0.05% O2. Naturally such environments require respiratory support for workers inside, which could be easily achieved by providing respiratory masks or helmets connected with the external atmosphere by flexible respiratory tubing.

A split air conditioner may be installed in order to control internal temperature and humidity levels. The internal part of the air conditioner 19 is installed inside enclosure 11 and is connected to the external part 20 by tube 21 having two conduits for circulation of a refrigerant and one conduit for removal of condensate. The working principle of this unit will be explained later. The installation of the air-conditioning unit can be beneficial for many applications because it removes heat, water and other vapors produced by people, some materials and in a variety of industrial processes. Split air-conditioning units suitable for some applications are manufactured by DeLonghi, Italy. Hypoxic cleanrooms of class 1000 and higher will require an external air-conditioning unit schematically shown in FIG. 3.

Figure 2:
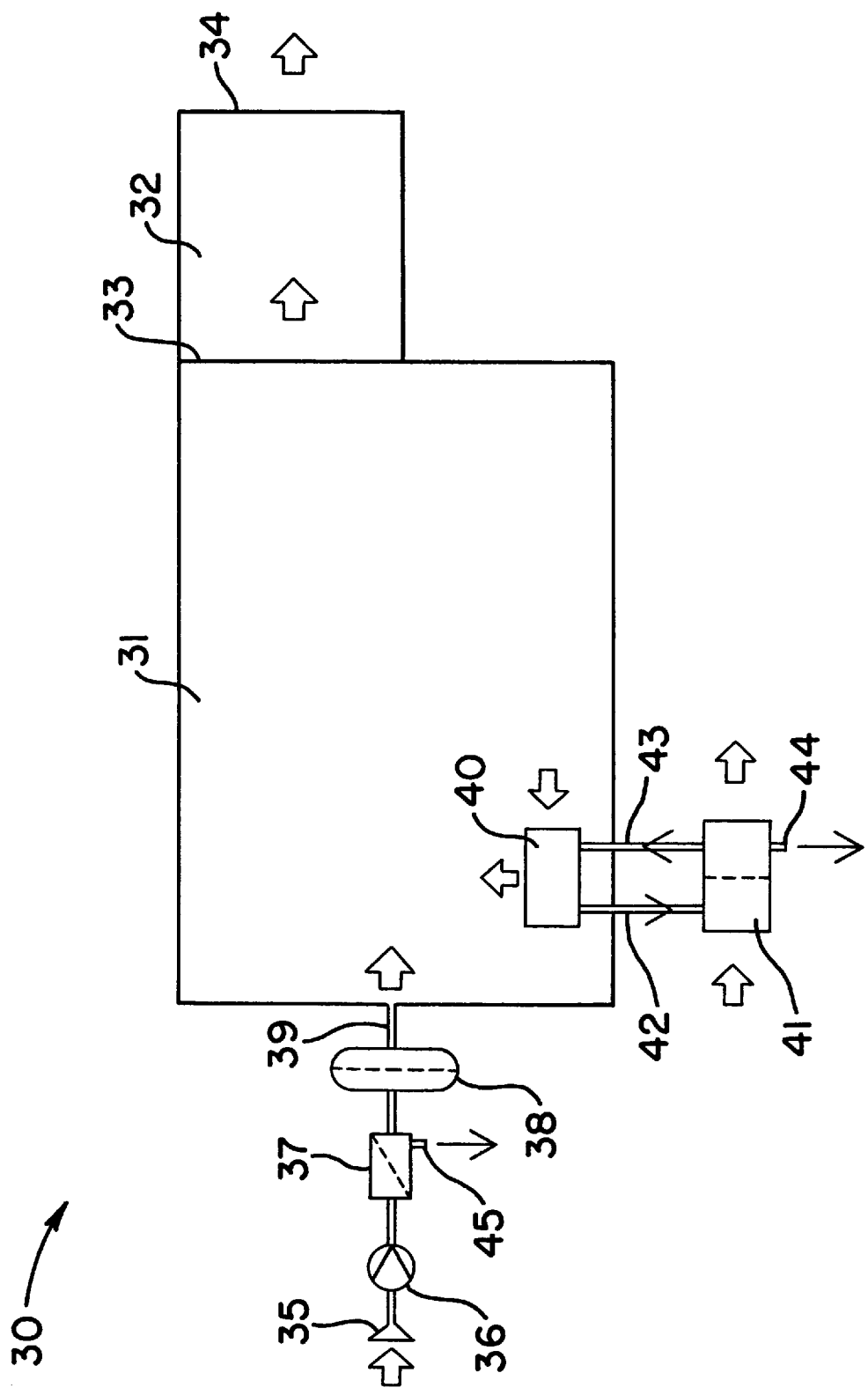
FIG. 2 illustrates a working principle of the most preferred embodiment of hypoxic cleanroom system.

FIG. 2 shows a schematic view and working principle of the most preferred embodiment 30.

An enclosure 31 with anteroom 32 is easily accessible through flap doors 34 and 33.

Ambient air is taken in outside enclosure 31 by compressor 36 through intake filter 35. Compressed air is delivered to air-separation unit 37, similar to 15 in FIG. 1, in which it is separated into an oxygen-enriched fraction being disposed of through outlet 45 and an oxygen-depleted fraction being delivered further inside enclosure 31 through filter means 38 and conduit 39. Filter means 38 can consist of a HEPA and/or ULPA filters which can provide effeciency up to 99.99999%, or a combination of different filter devices. The hypoxic gas mixture is discharged preferably in the upper portion of enclosure 31. A perforated ceiling or wall panel may be used for equal air distribution if necessary.

A split air-conditioning device can be installed for some applications having internal unit 40 inside enclosure 31 and external unit 41 outside enclosure 31. The hypoxic gas mixture from the lower portion of room 31 is drawn into unit 40 through a HEPA filter (not shown) and is cooled in a heat exchanger, then discharged back into room 31, preferably in the upper portion or through a perforated air-distribution panel (not shown). A warmed refrigerant leaves unit 40 through conduit 42 and arrives into a heat exchanger in external unit 41 for cooling by air drawn by an internal fan. After cooling, the refrigerant goes through conduit 43 back into internal unit 40. Condensate, which builds up in unit 40, is also removed through a separate tubing installed in conduit 42 and is disposed of through outlet 44.

Air conditioning unit 40 is very quiet, controllable from the inside of enclosure 31, which can clean substantial amounts of the inside air through its HEPA filter.

The hypoxic cleanroom system shown in FIG. 1 and 2 is most suitable for Class 100,000 cleanrooms used in production of pharmaceutical tablets and other medical products. The packaging of drugs, food supplements and many other products in low-oxygen environments provided by the hypoxic cleanroom system can extend their shelflife by several times. It also provides an excellent environment for people working in mild hypoxic environments without respiratory support. This system is cost-effective and energy-efficient because it uses a lower rate of air exchange than standard cleanrooms. In fact, a supply of only 50L/m of hypoxic air per person would be enough for establishing normal working condition.

Figure 3:
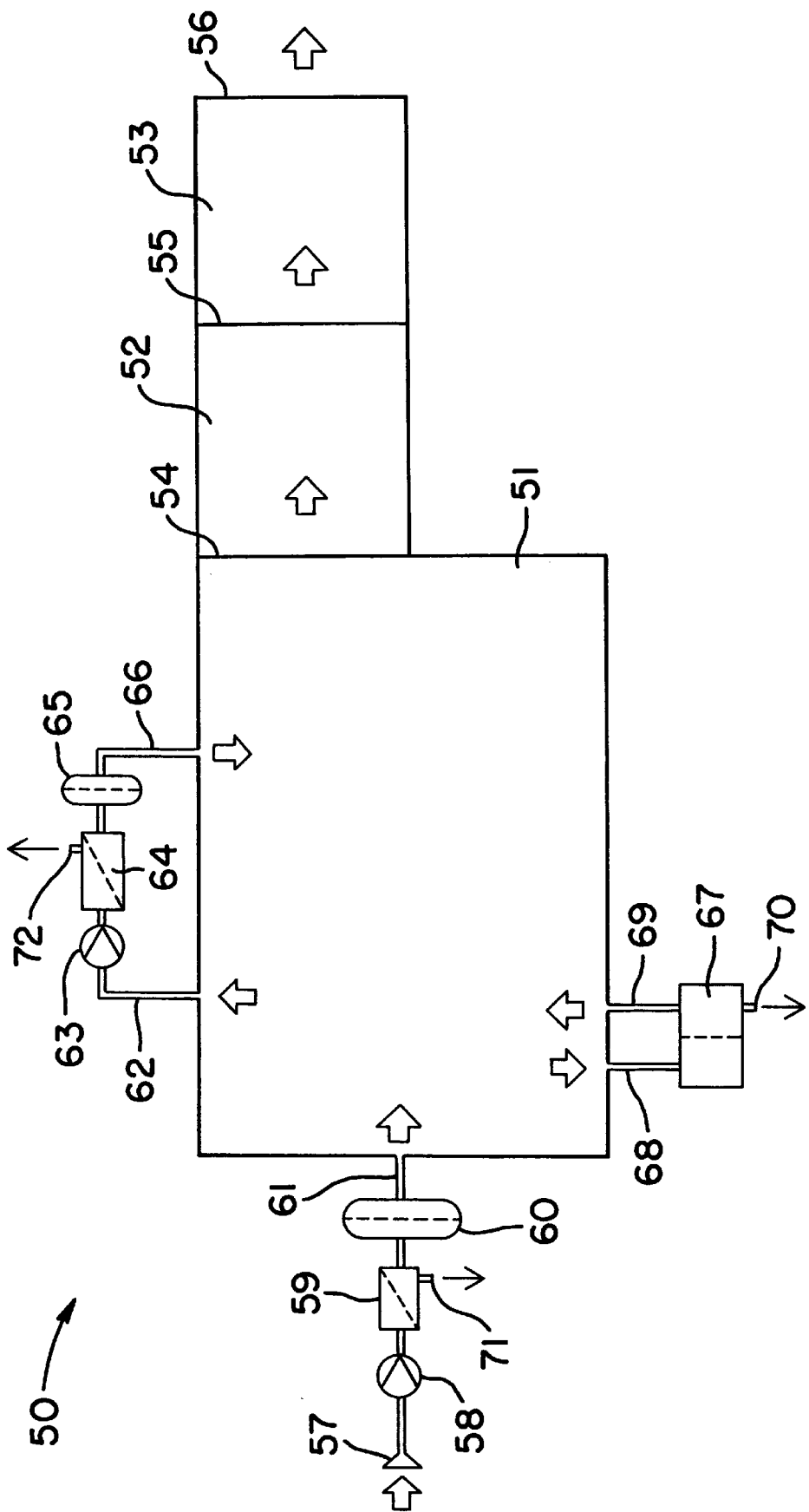
FIG. 3 illustrates a working principle of a superhypoxic cleanroom system with gas recycling and climate control.

FIG. 3 shows a schematic view and a working principle of a superhypoxic cleanroom system 50.

An enclosure 51 made of modular panels similar to 10 and having door 54 is easily accessible through anterooms 52 and 53 having doors 55 and 56. The number, size and shape of anterooms and type of doors may vary depending on application.

Ambient air is drawn by compressor 58 through intake filter or filtering system 57. Air compressed by compressor 58 is separated in air-separation unit 59 into an oxygen-enriched fraction being disposed through outlet 71 and an oxygen-depleted fraction which is delivered farther into filtering device 60 being in most cases a HEPA filter. The filtered hypoxic gas mixture is then delivered into hypoxic cleanroom 51 directly or through a special gas distribution system located preferably in the upper portion of the room 51, e.g. behind a perforated ceiling.

A second, less powerful air-separation system draws the hypoxic gas mixture from room 51 (preferably from its lower portion) and through conduit 62 into compressor 63 which delivers the compressed gas mixture to air-separation unit 64. In unit 64 the incoming gas mixture is separated into a fraction having a higher oxygen content than the incoming gas mixture being disposed through outlet 72 and a fraction of which has an extremely low oxygen level being delivered further through filter 65 and conduit 66 back into room 51, preferably into the same gas-distribution system as gas from 61.

The amount of gas leaving the system through outlet 72 must be less than the amount of gas entering room 51 through conduit 61. For example, if compressor 58 draws 500 liters per minute (Um) of ambient air, approximately 200L/m may be disposed through outlet 71 and 300L/m of gas with a 15% O2 content will be delivered into room 51. Compressor 63 may draw 300L/m of gas with a 15% oxygen content in which case approximately 100L/m may be lost through outlet 72 and 200L/m of gas with 8% O2 content will be returned into room 51. The same amount of gas (in this case 200L/m) entering room 51 through conduit 66 will leave the hypoxic cleanroom system (here through doors 54, 55 and 56).

An external air-conditioning unit 67 draws the internal gas mixture from the lower portion of cleanroom 51 through conduit 68, filters it again preferably through a HEPA filter, and after cooling delivers it through conduit 69 back into room 51, preferably through the same gas-distribution system. Condensate which might build up by the cooling process in unit 67 is removed through outlet 70. Gas intake conduits 62 and 68 are connected to an open duct or perforated gas-collecting tubing or piping (not shown) surrounding room 51 at the lower inside portion of wall panels, except door 54. In some cases gas can be drawn through a hollow floor panel(s) having a perforated upper side or layer. Such a perforated floor would be sealed off from the outside of the cleanroom, allowing air to enter only through the perforations, which is then sent directly into conduits 62 and 68. This, in conjunctin with the evenly-entering gas from the top of enclosure 51, will eliminate unnecessary turbulence in gas circulation inside room 51. A gas-collection hood made of plastic or airtight fabric, installed above the perforated ceiling of cleanroom 51 in order to collect and equally distribute gas entering from conduits 61, 66 and 69 is recommended.

The more gas is processed and cleaned by unit 67, the higher the class of cleanroom.

Secondary gas-separation system 64 has the additional benefits of the removal of water vapor and carbon dioxide produced by workers. This means no more costly respiratory support devices removing exhaled air from a cleanroom, and it means that portable isolated breathing-air-supply devices may be used in extreme hypoxic environments which is convenient for many applications.

The most suitable and economical type of air-separation unit 59 for this embodiment is a pressure-swing adsorption separator and a membrane separator for unit 64 or, for some applications in theopposite configuration. Units of the same type may be used, too.

Important rule: The amount of gas entering cleanroom 51 through conduit 61 must always be larger than the amount of gas disposed through outlet 72.

The hypoxic cleanroom system shown as embodiment 50 in FIG. 3 can provide clean hypoxic environments with an oxygen content as low as 0.1% and up to class 1000 of the cleanroom standard.

Figure 4:
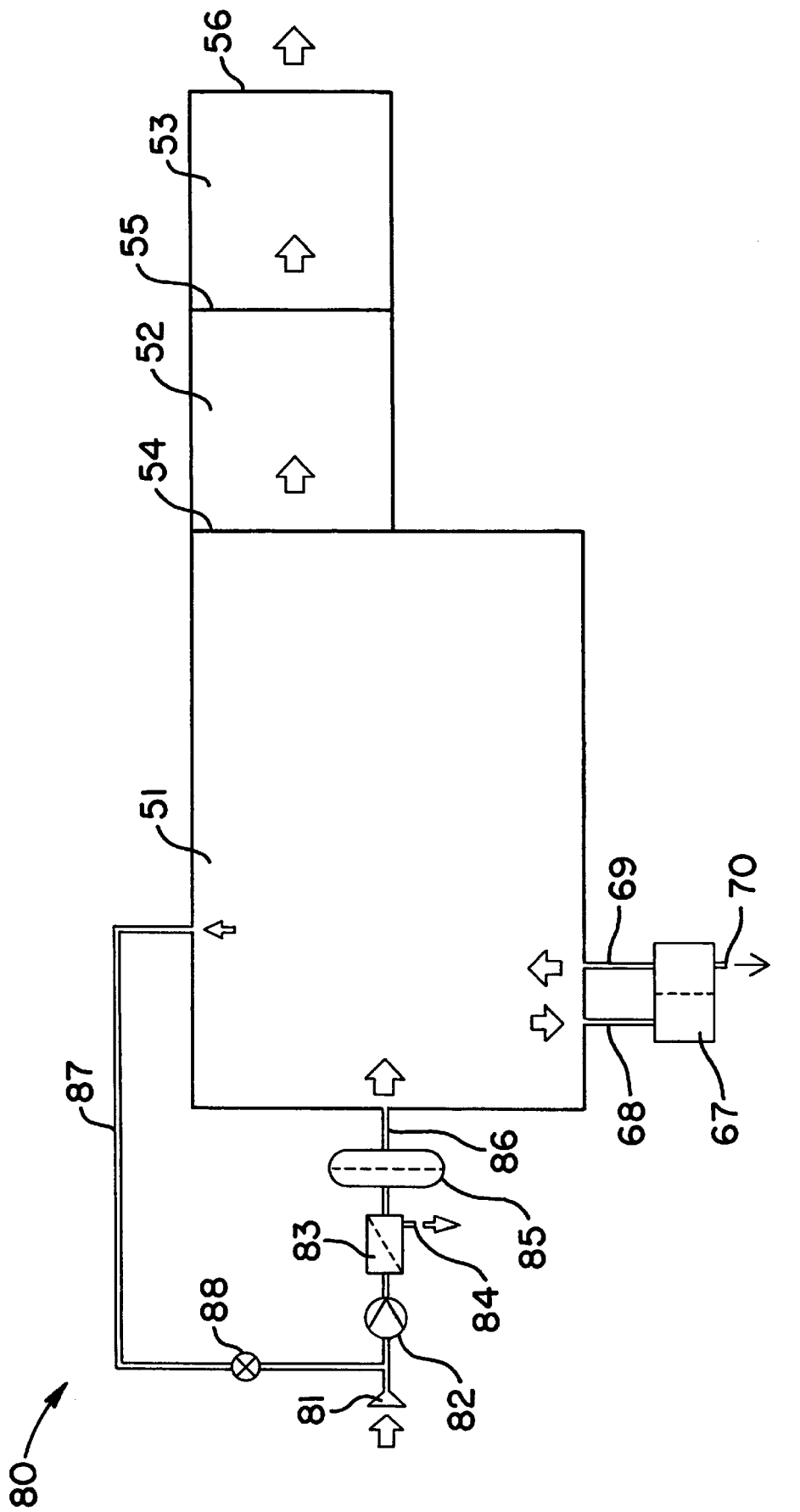
FIG. 4 shows a working principle of an energy-efficient, gas-recycling hypoxic cleanroom for any hypoxic environment.

FIG. 4 shows a low-cost and the most energy-efficient type of a hypoxic cleanroom 80.

The difference between embodiments 50 and 80 is that instead of a secondary air-separation system 64, a gas-recycling conduit 87 is installed connecting the internal environment in room 51 with an air intake of compressor 82 after intake filter 81. A part of the internal gas mixture is drawn back into the intake of compressor 82 mixing with fresh air incoming through filter 81.

The amount of gas intaken from the internal environment through conduit 87 must always be less than the amount of the gas mixture entering room 51 through conduit 86. Regulator 88 allows the control of the amount of air drawn back for recycling.

An air-separation system shown in embodiment 80 can consume 2–3 times less energy than a system shown in FIG. 1 and 2. As an example, the following approximate calculation is provided: in order to deliver 300L/m of hypoxic gas mixture with a 5% oxygen content, compressor 36 must supply 700L/m of air compressed at 11 bar to a separation unit 37 which must employ in this case a nitrogen-enrichment membrane. This requires a minimum of 6Hp of compressor capacity.

To establish the same hypoxic (5% O2) condition inside an enclosure of the same size of system 80 will require only a 2Hp compressor 82 providing the same 300L/m of hypoxic gas mixture. This is possible because there is no longer the need to compress processed air up to 11 bar in order to achieve a high separation rate. Compressor 82 may compress incoming air only up to 3 bar in case of membrane separator 83 or up to 2 bar in case separator 83 employs a pressure-swing adsorption technology, which is possible in this application because a much lower separation rate is needed--approximately 15% O2 at the start of operation. When, for example, the oxygen content in the internal gas mixture achieves a 15% level, separator 84 will provide gas mixture with only 8% O2, and at a 10% O2 level in room 51 the gas entering through conduit 86 will have only 5% oxygen, and so on, until the desired hypoxic condition is achieved.

The hypoxic gas-recycling system presented in FIG. 4 can be employed in many industrial applications beyond pharmaceutical and electronic component manufaturing which are the expected major users of the invented system.

Every year millions of tons of frozen meat, fish and poultry must be transported and stored in the U.S. alone, and up to 10% of that huge quantity of food disappears into the "thin air" of freezers and other cooling equipment.

The invented hypoxic gas-recycling system opens tremendous possibilities for food processing, packaging, storage and transportation industries. This system can be used also for processing, transportation and storage of explosive and corrosive materials or even for creating "dead" environments protecting from intruders or biological contaminants.

Meat, poultry and other food products can be processed, packaged and stored in mild hypoxic cleanroom environments with an oxygen content of about 15%, which corresponds to an "altitude" of approximately 8,500 feet or 2,600 m, and is absolutely safe for work without respiratory support. There will no longer be the need to work in cold and unhealthy places, and hypoxic training can even improve workers' health (see previous patent applications on hypoxic training and therapy). Most airborne microorganisms will be destroyed in such environments and meat products can be processed without cooling processing environments.

Many thousands of refrigeration trucks and containers can be converted into hypoxic cleanroom transports. A hypoxic gas-recycling system using a compressor less powerful than one used for refrigeration in these trucks can maintain an extreme hypoxic environment inside a food container during transportation with an oxygen content of about 5%. This will allow the transport of fresh meat and other food products without freezing and weight loss. Fruits, vegetables, flowers and other agricultural products will retain their metabolisms and can be delivered absolutely fresh and without loss from spoilage.

Food-storage facilities can benefit from huge energy savings by completely or partially forgoing refrigeration practice. Even in the home, hypoxic food-storage cabinets can be used instead of refrigerators.

The best gas-separation devices for the food industry are those employing pressure-swing adsorption technology because they do not remove water vapor from processed gas. Suitable hypoxic gas-recycling systems for food trucks and processing plants are available from Hypoxico Inc.

Figure 5:
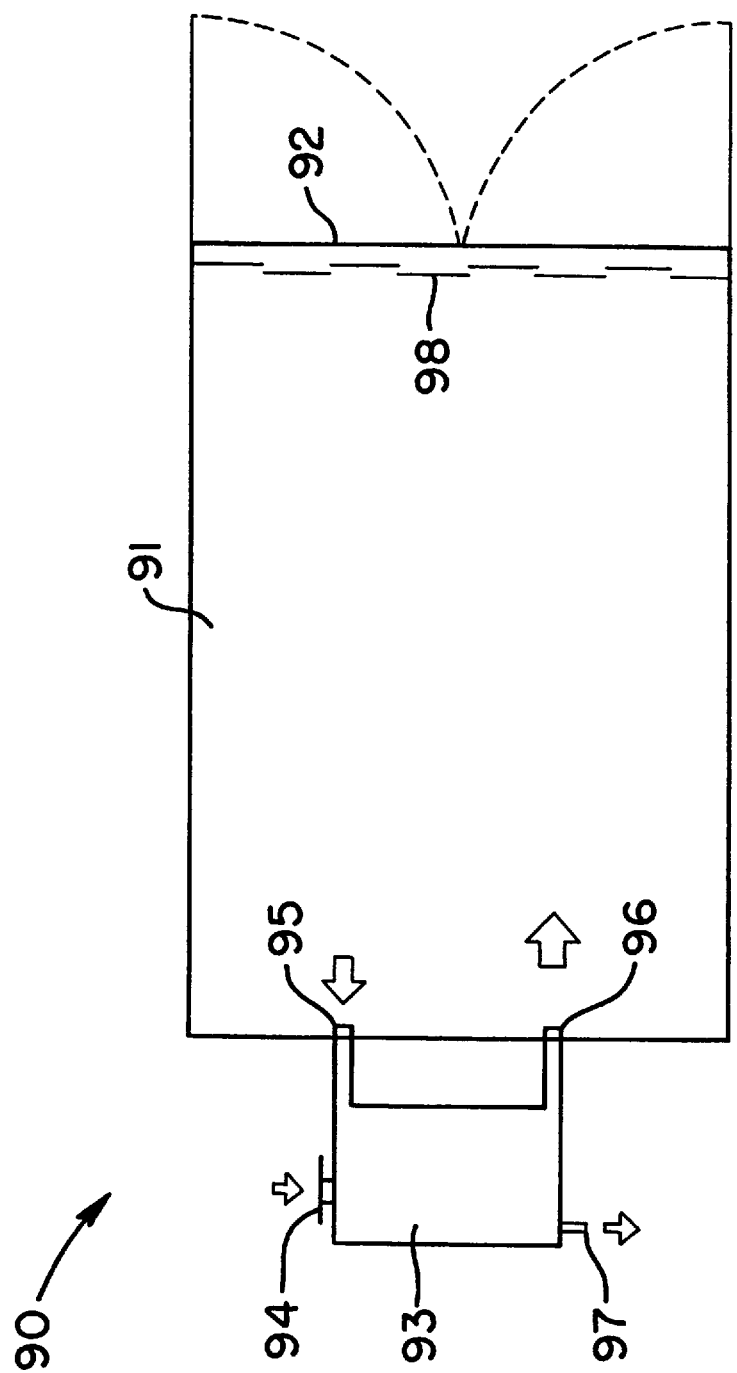
FIG. 5 illustrates a working principle of a hypoxic system for a transportation container or storage enclosure.

FIG. 5 shows a schematic view 90 of a food storage or transportation container employing the hypoxic gas-recycling technology shown on FIG. 4.

A food container 91 having outside rigid door 92 and a soft flap door 98 is equipped with hypoxic gas-recycling system 93 which has a fresh-air intake opening 94, recycled-gas intake conduit 95, disposal outlet 97 and hypoxic product outlet 96.

After door 92 is closed, hypoxic gas-recycling unit 93 draws air for separation from the outside atmosphere through intake 94 and from the inside of container 91 through intake 95. An oxygen-enriched fraction will be disposed of through outlet 97 and hypoxic gas product discharged inside container 91 through outlet 96. The working principle of unit 93 is shown on FIG. 4 as an assembly of components 81, 82, 83, 84, 85, 86, 87 and 88. An excessive hypoxic gas mixture, building up a slightly positive pressure inside container 91 will always find its way out mainly through leaks around door 92 and will keep outside dust from entering container 91. Trucks which frequently load and unload goods should install flap door 98 which will help keep the hypoxic atmosphere inside.

For many food storage and processing applications a HEPA filtering device located after a separation unit may be removed completely or replaced by cheaper filters because the provided gas mixture will be clean enough after being processed through the system. A compressor with a 0.5 Hp motor would be enough to produce and keep a hypoxic environment with a 10% O2-content inside such a truck container. The pressure-swing adsorbtion technology similar to that used in medical oxygen generators is most suitable for food storage and transportation equipment because it does not dehumidify the gas product like membrane-separation units do.

The same type of truck containers with near-zero oxygen-content environments should be used for transportation of highly-inflammable and explosive materials. The same technology should be applied to sections of airplanes carrying cargo and fuel.

The same principle can be applied to a household food-storage cabinet which could be an environmently-friendly alternative to conventional refrigerators with many benefits including the absence of bacteria found in all refrigerators which produces a gas which spoils the taste of refrigerated food.

A combination of a conventional refrigerator with hypoxic cleanroom technology will permit the keeping of fresh meat products, vegetables and fruits for weeks without freezing.

Figure 6:
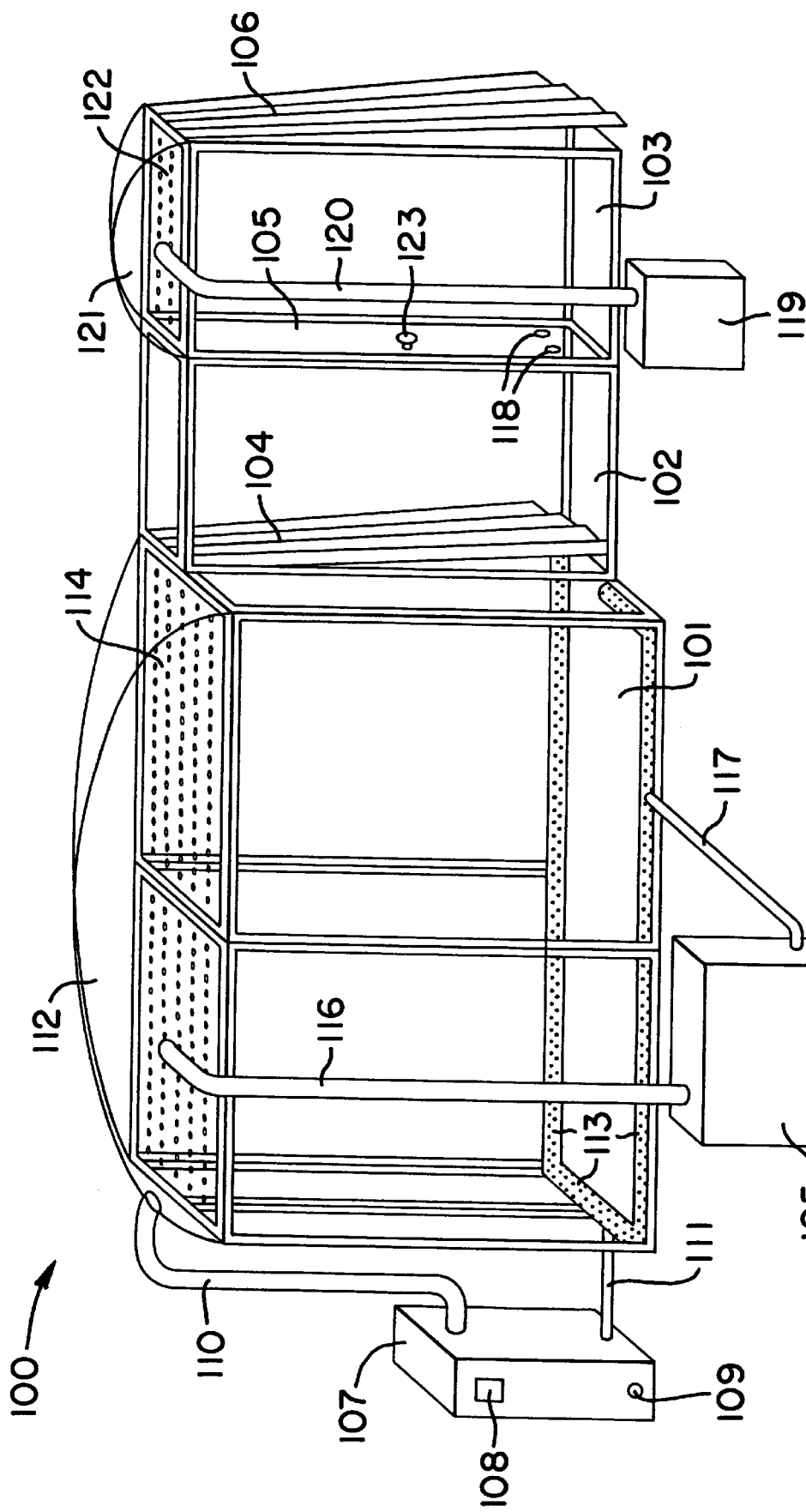
FIG. 6 shows a schematic view of an advanced hypoxic cleanroom system for superclean applications.

FIG. 6 shows a simplefied view and a working principle of an advanced hypoxic cleanroom system 100 for super-clean applications.

An enclosure 101 with anteroom 102 is hermetically closed to the outside atmosphere by airtight rigid door 105 having knob 119 and pressure-relief valves 118. Anteroom 103 preferably having a soft flap door 106 is connected to anteroom 102. Door 104 is also preferably made of soft vinyl flaps but can be also made as an airtight rigid door.

Further system 100 consists of an air-separation-and-recycling unit 107 similar to the one shown on FIG. 4 and described earlier as a combination of components 81, 82, 83, 84, 85, 86, 87 and 88. Unit 107 has an air-intake filter 108, hypoxic gas supply hose 110, gas recycling conduit 111 and disposal outlet for oxygen-enriched gas mixture 109. A hypoxic gas mixture is supplied through duct 110 into a gas-collecting hood 112 made of soft or rigid synthetic material and preferably of an airtight nylon fabric. Hood 112, shown as clear on the drawing, is connected hermetically to the wall panels of enclosure 101 being separated from it by a perforated air-distribution ceiling 114 located on the top of enclosure 101. On the bottom of enclosure is a gas-intake tube or duct 113 having inlet perforations distibuted evenly throughout the length of the duct which runs along the walls of the enclosure ending at both sides of door 114.

Gas-circulation-and-conditioning unit 115 takes in internal gas mixture from duct 113 through conduit 117, filters it through a HEPA filter, and after cooling and (optionally) humidifying it, returns it through duct 116 back under hood 112. Filtering, cooling and humidifying components of unit 115 are not shown on FIG. 6 because their design and working principle are well-known to those skilled in the art. Gas supply ducts 110, 116, and 120 are made preferably from airtight nylon fabric or flexible synthetic material having airtight connections to hoods 112 and 121.

The amount of air circulating through unit 115 is regulated by a computerized control unit (not shown here) receiving data from a particle counter and temperature-and-humidity meter installed inside hypoxic cleanroom 101 in order to maintain necessary parameters. Unit 115 employs a blower which can supply/remove enough gas mixture to maintain desired cleanroom class. For example, if class 100 is needed and internal particle counter confirms that there are only 50 ppm in the hypoxic environment, unit 115 will run at the lowest, most energy-saving mode until 100 ppm level is reached, provided the temperature and humidity comply with the application.

First anteroom 103 having flap door 106 and hood 121 above the perforated ceiling is also equipped with a standard airshower feature provided by clean-air supply unit 119 able to provide large quantities of filtered air. A blower of unit 119 takes in ambient air, filters it through a HEPA filter and supplies it through duct 120 under hood 121. From hood 121 clean air at high velocity goes through perforated ceiling 122, removing dust particles from the clothes of personnel entering hypoxic cleanroom 101. Of course, the airshower works only when somebody is entering system 100.

After the airshower procedure is completed, airtight door 105 may be opened and a worker may enter second anteroom 102 and further cleanroom 101 through flap door 104. Airtight door 105 has pressure-relief valves 118 installed preferably in its lowest portion. This will allow the regulation of pressure inside cleanroom 101 from normal atmospheric pressure outside the cleanroom to a higher positive pressure level required by application. The number of anterooms and their door design may vary depending on application.

For a cleanroom class 100 and lower applications, special hollow floor panels should be installed inside enclosure 101, made of ceramic or metal with a perforated upper side for collecting recycling gas mixture. These panels must be sealed from outside the structure with outlets hermetically connected to conduits 111 and 117. Perforated gas-distributing ceiling 114 together with a perforated gas-distributing floor will create a turbulence-free vertical laminar flow of hypoxic gas mixture inside cleanroom 101.

Unit 115 is also equipped with a gas-cooling device and, if required by application, also with a humidifier. Both devices are regulated manually or by a computerized control unit (not shown) receiving data from temperature and humidity tranducers located inside the hypoxic cleanroom. An oxygen transducer may regulate performance of unit 107, if necessary.

A big advantage of this system is that we can provide any flow capacity required by cleanroom applications using recirculation unit 115, however, its filter does not have to be changed for years. Most conventional cleanroom systems require filters to be changed once a week or once a month, which interrupts the production process, and most of these filters are very large and expensive structures installed on the top of a cleanroom behind a ceiling and are designed to separate large quantities of dust from an ambient air. The invented system requires only small, inexpensive (mostly tubular-type) HEPA filters which can be changed in seconds. Actually, any conventional cleanroom air-supply equipment may be employed as a unit 115, with the only differences being that it has to draw air from the cleanroom, and their large filters will last for many years without exchange.

Hypoxic cleanroom system 100 can comply with classes 100, 10 or lower and is perfect for production and packaging of sensitive electronic components, implants, blood products, medications, biological and chemical research, processing and/or storage of oxygen-sensitive and corrosive materials, etc.

What is claimed, is:

1. A system for providing a clean oxygen-depleted environment, said system comprising:

a hypoxic chamber having internal environment therein containing a gas mixture which is cleaner and lower in oxygen content than air outside said chamber, and an entry communicating with said internal environment;

an oxygen-extraction device having an inlet taking in an intake gas mixture and first and second outlets, said first outlet transmitting a first gas mixture having a higher oxygen content than the intake gas mixture and said second outlet transmitting a second gas mixture having a lower oxygen content than the intake gas mixture;

said inlet of said oxygen-extraction device having gas-recycling conduit communicating with said internal environment and taking in internal gas mixture from said internal environment, and providing said internal gas mixture for mixing with ambient air intaken outside said chamber and forming said intake gas mixture;

a filtering device communicating with said second outlet and said internal environment and taking in said second gas mixture from said second outlet for cleaning from airborne particles to desired proportions, said second gas mixture being transmitted after cleaning to said internal environment;

said second outlet communicating with said internal environment and transmitting said second mixture to said internal environment so that said second mixture mixes with the air in the internal environment;

said first outlet transmitting said first mixture to a location where it does not mix with the air in the internal environment.

2. The invention according to claim 1 and said internal environment having oxygen content ranging from 0.01% to 17%.

3. The invention according to claim 1 and said oxygen-extraction device employing gas-adsorption technology and said gas-recycling conduit being not a part of said system, said intake gas mixture is ambient air intaken outside said chamber.

4. The invention according to claim 1 and said hypoxic chamber being made of modular wall and ceiling panels having airtight connections to each other and the floor under the chamber;

said hypoxic chamber having none, one, two or three anterooms isolated from chamber and each other by soft flap doors in rigid frames or by rigid airtight doors.

5. The invention according to claim 1 and said chamber having gas collecting structure inside for collecting and transmitting said internal gas mixture back into said oxygen-extraction device through said gas-recycling conduit.

6. The invention according to claim 1 and said system having gas-recirculation device intaking internal gas mixture from said chamber, filtering and releasing this gas mixture back into said chamber, creating purified environment inside said chamber said purified environment being in compliance with the cleanroom classes from 0.1 to 100,000 for cleanroom applications.

7. The invention according to claim 6 and said gas-recirculation device having climate control feature allowing to monitor and regulate temperature and humidity of the internal gas mixture inside said chamber.

8. A hypoxic system for providing a clean low-oxygen atmosphere for industrial and non-industrial applications comprising:

a chamber comprising a door and wall structure defining a closed space which is accessible through the door, said door being selectively closable so that when closed, the chamber is substantially isolated from the outside environment;

a gas processing device having an intake and first and second outlets, said device taking in an intake gas mixture through said intake and emitting a reduced-oxygen gas mixture having a lower concentration of oxygen than said gas mixture through said first outlet and enriched-oxygen as mixture having a greater concentration of oxygen than said gas mixture through said second outlet;

a gas-recycling conduit connected to said intake and communicating with said closed space allowing drawing of internal gas mixture from said closed space into said intake which takes in ambient air from the outside environment and wherein this internal gas mixture is mixed with the ambient air providing said intake gas mixture for processing in said gas processing device;

said first outlet being connected with said chamber so that reduced oxygen gas mixture is emitted into said closed space inside the chamber;

said gas processing device comprising a pump receiving the gas mixture from the intake and a separation unit with a reduced oxygen mixture conduit and an enriched oxygen mixture conduit;

said first outlet being operatively associated with said reduced oxygen mixture conduit and receiving said reduced oxygen gas mixture therefrom, said second outlet being operatively associated with said enriched oxygen mixture conduit and receiving said enriched oxygen gas mixture therefrom and releasing said mixture into the outside environment.

9. The invention according to claim 8 and said reduced oxygen mixture conduit having filter means providing the separation of the transmitted gas mixture from airborne particles and dust.

10. The invention according to claim 8 and said hypoxic system having external gas recirculation unit with inlet and outlet, both communicating with the closed space inside said chamber;

said inlet being connected to gas collecting means inside said chamber and said outlet having airtight connection to gas releasing means distributing emitted from said outlet gas mixture inside said chamber.

11. The invention according to claim 10 and said gas collecting means can be perforated ducts surrounding lower inside portion of said chamber and/or floor panels having perforations in upper sides and establishing a hollow structure airtight to the outside environment and communicating with said inlet;

said gas releasing means consisting of hood having airtight connection to wall structure of said chamber and separated from said chamber by perforated ceiling which allows gas mixture emitted under hood to penetrate into said chamber and create vertical laminar flow of hypoxic gas mixture.

12. The invention according to claim 10 and said gas recirculation unit having a filter for cleaning recirculating gas mixture from airborne particles and providing temperature and humidity control of said gas mixture.

13. The invention according to claim 8 and said door being preferably flexible door having synthetic flaps in rigid frame;

said chamber having anteroom with entry and preferably rigid door communicating with another anteroom having standard airshower equipment and flexible flap door;

said rigid door having pressure relief valves for releasing excessive gas mixture from said chamber;

said chamber having hypoxic cleanroom environment inside complying with cleanroom classes from 0.1 to 100,000.

14. The invention according to claim 8 and said chamber being enclosure used for: manufacturing and packaging of electronic components, chemical, biological, pharmaceutical and other medical products; processing, packaging, storage and transportation of food products, explosive and corrosive materials; protection from intruders or biological contaminants; and other industrial applications which may require microenvironments with low oxygen content.

15. The invention according to claim 10 and said gas mixture inside said chamber having oxygen content ranging from 0.01% to 20.9%.

16. The invention according to claim 8 and said chamber being food storage cabinet for household or industrial applications with optional climate control.

17. The invention according to claim 8 and said chamber being transportation container with temperature and humidity control;

said gas processing device being installed inside or outside said container.

18. A hypoxic system for food storage or transportation and other industrial or household applications, said system comprising:

a chamber comprising a door and wall structure substantially isolating an internal environment inside said chamber;

an oxygen-extraction device having first and second outlet and an intake comprising first and second inlet;

said intake communicating with the internal environment through said first inlet and receiving internal gas mixture from it;

said second inlet communicating with the atmosphere outside said chamber and receiving an ambient air for adding to the internal gas mixture transmitted through the first inlet and creating an intake gas mixture, said intake gas mixture being separated by the oxygen-extraction device into oxygen-reduced fraction and oxygen-enriched fraction;

said first outlet communicating with said internal environment and transmitting said oxygen-reduced fraction to this internal environment, said second outlet transmitting said oxygen-enriched fraction and releasing it into external atmosphere;

said internal environment having temperature and humidity control.

19. The invention according to claim 18 and said oxygen-extraction device employing Pressure-swing adsorption technology for separating said intake gas mixture into said oxygen-reduced and said oxygen enriched fractions;

said intake not communicating with said internal environment and said first inlet being absent; said intake gas mixture being ambient air.

* * * * *